United States Patent
Huang et al.

(10) Patent No.: US 8,902,918 B2
(45) Date of Patent: Dec. 2, 2014

(54) HIGH SPEED UPLINK PACKET ACCESS ADAPTIVE RETRANSMISSION METHOD AND APPARATUS

(75) Inventors: Xin Huang, Shanghai (CN); Dingzhang Dai, Shanghai (CN); Hongwei Wang, Shanghai (CN); Fangfu Guo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 48 days.

(21) Appl. No.: 13/449,967

(22) Filed: Apr. 18, 2012

(65) Prior Publication Data

US 2012/0201121 A1    Aug. 9, 2012

Related U.S. Application Data

(63) Continuation of application No. PCT/CN2010/077762, filed on Oct. 15, 2010.

(30) Foreign Application Priority Data

Oct. 20, 2009    (CN) .......................... 2009 1 0205509

(51) Int. Cl.
| | |
|---|---|
| H04J 3/16 | (2006.01) |
| H04J 3/22 | (2006.01) |
| H04L 1/18 | (2006.01) |
| H04L 1/00 | (2006.01) |

(52) U.S. Cl.
CPC ............ *H04L 1/1825* (2013.01); *H04L 1/0015* (2013.01); *H04L 1/1883* (2013.01)
USPC .......................................... 370/437; 370/465

(58) Field of Classification Search
CPC ............................ H04L 1/1883; H04L 1/1825
USPC .................................................. 370/216, 437
See application file for complete search history.

(56) References Cited

U.S. PATENT DOCUMENTS

| | | |
|---|---|---|
| 2002/0172192 A1 | 11/2002 | Hunzinger et al. |
| 2005/0286416 A1* | 12/2005 | Shimonishi et al. .......... 370/229 |

(Continued)

FOREIGN PATENT DOCUMENTS

| | | |
|---|---|---|
| CN | 1889412 | 1/2007 |
| CN | 101141671 | 3/2008 |

(Continued)

OTHER PUBLICATIONS

Ericsson, "EUL coverage enhancements", 3GPP TSG-RAN WG1 #52, Mar. 31-Apr. 4, 2008, 5 pages.

(Continued)

*Primary Examiner* — Noel Beharry
*Assistant Examiner* — Joe Combs
(74) *Attorney, Agent, or Firm* — Staas & Halsey LLP

(57) ABSTRACT

An embodiment of the present invention discloses a high speed uplink packet access adaptive retransmission method and apparatus. The method includes: obtaining a resource limitation state; performing adjustment decision according to the resource limitation state and a current target number of retransmissions of a UE; and adjusting the target number of retransmissions of the UE between a preset large target number of retransmissions and a preset small target number of retransmissions, where the large target number of retransmissions is greater than the small target number of retransmissions. The utilization rate of resources may be effectively improved.

18 Claims, 4 Drawing Sheets

(56) References Cited

U.S. PATENT DOCUMENTS

| | | |
|---|---|---|
| 2006/0084389 A1 | 4/2006 | Beale et al. |
| 2008/0076442 A1* | 3/2008 | Ishii et al. .................. 455/453 |
| 2008/0248823 A1* | 10/2008 | Morita ......................... 455/509 |
| 2008/0282125 A1 | 11/2008 | Hafeez et al. |
| 2009/0092120 A1* | 4/2009 | Goto et al. .................. 370/345 |
| 2009/0138778 A1 | 5/2009 | Jugl et al. |
| 2009/0196195 A1* | 8/2009 | Gerstenberger et al. ...... 370/252 |
| 2009/0201856 A1* | 8/2009 | Hayashi et al. ............... 370/328 |
| 2009/0280822 A1* | 11/2009 | Ericson et al. ............ 455/452.2 |
| 2010/0034185 A1* | 2/2010 | De Bruin et al. ............. 370/342 |
| 2010/0080191 A1* | 4/2010 | Kinoshita ..................... 370/331 |
| 2010/0208770 A1* | 8/2010 | Wigren ......................... 375/141 |
| 2010/0214931 A1* | 8/2010 | Wigren ......................... 370/242 |
| 2010/0273500 A1* | 10/2010 | Romero et al. ............ 455/452.2 |
| 2010/0315947 A1* | 12/2010 | Wigren ......................... 370/230 |
| 2011/0003559 A1* | 1/2011 | Morita et al. .............. 455/67.14 |
| 2011/0201367 A1* | 8/2011 | Aminaka et al. .............. 455/501 |
| 2011/0244809 A1* | 10/2011 | Wigren ....................... 455/67.11 |
| 2011/0275399 A1* | 11/2011 | Englund et al. ................ 455/513 |
| 2012/0002610 A1* | 1/2012 | Widegren et al. ............ 370/328 |
| 2012/0020228 A1* | 1/2012 | Ding et al. .................... 370/252 |
| 2012/0028669 A1* | 2/2012 | Ljung ........................... 455/517 |
| 2012/0082195 A1* | 4/2012 | Wigren ......................... 375/220 |
| 2012/0163420 A1* | 6/2012 | Persson et al. ................ 375/144 |
| 2013/0308480 A1* | 11/2013 | Wigren et al. ................ 370/252 |

FOREIGN PATENT DOCUMENTS

| | | |
|---|---|---|
| CN | 101174878 | 5/2008 |
| CN | 101277176 | 10/2008 |
| WO | WO 2008066433 A1 * | 6/2008 |
| WO | 2009/076903 | 6/2009 |
| WO | 2009/138033 | 11/2009 |

OTHER PUBLICATIONS

First Chinese Office Action issued Aug. 3, 2012 in corresponding Chinese Patent Application No. 200910205509.9.

International Search Report of Corresponding PCT Application PCT/CN2010/077762 mailed Jan. 20, 2011.

Extended European Search Report, dated Aug. 29, 2012, in corresponding European Application No. 10824447.6 (8 pp.).

Office Action, dated May 7, 2013, in corresponding Chinese Application No. 200910205509.9 (7 pp.)

International Search Report mailed Jan. 20, 2011 issued in corresponding International Patent Application No. PCT/CN2010/077762.

Written Opinion of the International Searching Authority mailed Jan. 20, 2011 issued in corresponding International Patent Application No. PCT/CN2010/077762.

* cited by examiner

HIGH SPEED UPLINK PACKET ACCESS ADAPTIVE RETRANSMISSION METHOD AND APPARATUS

CROSS-REFERENCE TO RELATED APPLICATIONS

This application is a continuation of International Application No. PCT/CN2010/077762, filed on Oct. 15, 2010, which claims priority to Chinese Patent Application No. 200910205509.9, filed on Oct. 20, 2009, both of which are hereby incorporated by reference in their entireties.

FIELD OF THE INVENTION

The present invention relates to the field of communication technologies, and in particular, to a high speed uplink packet access (HSUPA, High Speed Uplink Packet Access) adaptive retransmission method and apparatus.

BACKGROUND OF THE INVENTION

In a Wideband Code-Division Multiple Access (WCDMA, Wideband Code-Division Multiple Access) system, an HSUPA technology is introduced, and uplink high-speed data transmission is implemented through a series of key technologies.

The method for controlling quality of service (QoS, Quality of Service) in HSUPA is: setting a fixed parameter "target number of retransmissions", to make the average number of retransmissions (NHR, Number of HARQ Retransmissions) of the service converge at the "target number of retransmissions".

The retransmission method used here is a Hybrid Automatic Repeat Request (HARQ, Hybrid Automatic Repeat Request). In the HARQ retransmission, an acknowledgement mechanism is used.

In the prior art, the configuration of the "target number of retransmissions" is generally fixed. When the "target number of retransmissions" is configured to be a small value, because the number of HARQ retransmissions is small, for a UE which is located in the center of a cell of which the load is light, the transmission rate may approach or reach the utmost rate (namely, the maximum theoretic transmission rate) with rapid increase of the physical-layer rate. However, for the UE located at the edge of coverage of the cell, the transmission power tends to be limited. In this case, when the number of HARQ retransmissions is small, a large transport block (TB, Transport Block) cannot be sent, and the transmission rate of the UE may decrease obviously, which may affect the UE experience. Besides, for a heavy-loaded cell, as limited by the load, the transmission rate of the UE cannot be improved. In this case, if a great "target number of retransmissions" is configured and power efficiency is improved by accomplishing diversity gain, the transmission rate of the UE at the edge of coverage of the cell and the transmission rate of the UE in heavy-loaded cells may still be improved. It can be seen that, the capacity of the cell configured with a smaller "target number of retransmissions" is also limited.

When the "target number of retransmissions" is configured to be a large value, for the UE that suffers limited transmission power because the UE is located at the edge of coverage of the cell, and for the UE in a heavy-loaded cell, due to a larger number of HARQ retransmissions of the UE, diversity gain can be obtained, higher power efficiency can be accomplished, the amount of data transmitted by such UEs is increased, and the capacity of the cell is increased. However, when the load of the cell is light, the physical-layer rate of the UE located at the center of the cell can approach or reach the maximum theoretic transmission rate quickly, but due to frequent HARQ retransmissions, the effective transmission rate of the UE located at the center of the light-loaded cell cannot reach the maximum value. Moreover, with sharp decrease of the number of retransmissions, the user experience is affected.

SUMMARY OF THE INVENTION

Embodiments of the present invention provide a High Speed Uplink Packet Access adaptive retransmission method and apparatus, which may improve utilization rate of resources effectively.

An aspect of the present invention is to provide a High Speed Uplink Packet Access adaptive retransmission method, including:
  obtaining, by a network device, a resource limitation state;
  performing, by the network device, adjustment decision according to the resource limitation state and a current target number of retransmissions of a UE; and
  adjusting, by the network device, according to a result of the adjustment decision, a target number of retransmissions of the UE between a preset large target number of retransmissions and a preset small target number of retransmissions, where
  the large target number of retransmissions is greater than the small target number of retransmissions.

Another aspect of the present invention is to provide a high speed uplink packet access adaptive retransmission apparatus, including:
  an obtaining unit, configured to obtain a resource limitation state;
  an adjustment deciding unit, configured to perform adjustment decision according to the resource limitation state obtained by the obtaining unit and a current target number of retransmissions of a UE; and
  an executing unit, configured to adjust, according to a result of the adjustment decision of the adjustment deciding unit, a target number of retransmissions of the UE between a preset large target number of retransmissions and a preset small target number of retransmissions, where the large target number of retransmissions is greater than the small target number of retransmissions.

It can be seen from the technical solution above that, whether to use the large target number of retransmissions or the small target number of retransmissions may be decided according to different resource limitation states, so a more appropriate target number of retransmissions may be effectively selected for different scenarios, and the resource utilization rate may be effectively improved.

BRIEF DESCRIPTION OF THE DRAWINGS

To make the technical solution of the present invention or the prior art clearer, accompanying drawings to be used in the description of the embodiments of the present invention or the prior art are introduced briefly in the following. Apparently, the accompanying drawings described below are only some embodiments of the present invention, and persons of ordinary skill in the art can derive other drawings from these drawings without making any creative effort.

DETAILED DESCRIPTION OF THE EMBODIMENTS

The technical solution of the present invention is described clearly and completely in the following in conjunction with the accompanying drawings in the embodiments of the present invention. Evidently, the embodiments to be described are only some rather than all of the embodiments of the present invention. All other embodiments, which are derived by those skilled in the art based on the embodiments of the present invention without any creative effort, shall fall within the protection scope of the present invention.

An embodiment of the present invention provides a high speed uplink packet access adaptive retransmission method and apparatus to improve utilization rate of resources.

An embodiment of the present invention provides a High Speed Uplink Packet Access adaptive retransmission method, including:

obtaining resource limitation states of various resources;

performing adjustment decision according to the resource limitation state and a current target number of retransmissions of a UE; and adjusting, according to a result of the adjustment decision, a target number of retransmissions of the UE between a preset large target number of retransmissions and a preset small target number of retransmissions, where the large target number of retransmissions is greater than the small target number of retransmissions.

The performing adjustment decision according to the resource limitation state and the current target number of retransmissions of the UE includes: when preset time arrives, performing adjustment decision according to the resource limitation state and the current target number of retransmissions of the UE.

In this embodiment, whether to use the large target number of retransmissions or the small target number of retransmissions is decided according to different resource limitation states, so more appropriate target number of retransmissions is selected for different scenarios, and the resource utilization rate is improved.

The resource limitation state relates to the target number of retransmissions, and specifically, may include at least one of the following: load limitation state of the cell, limitation state of the transmission power of the UE, limitation state of the physical capability of the UE, and resource limitation state of channel element (CE) resource.

Figure 1:
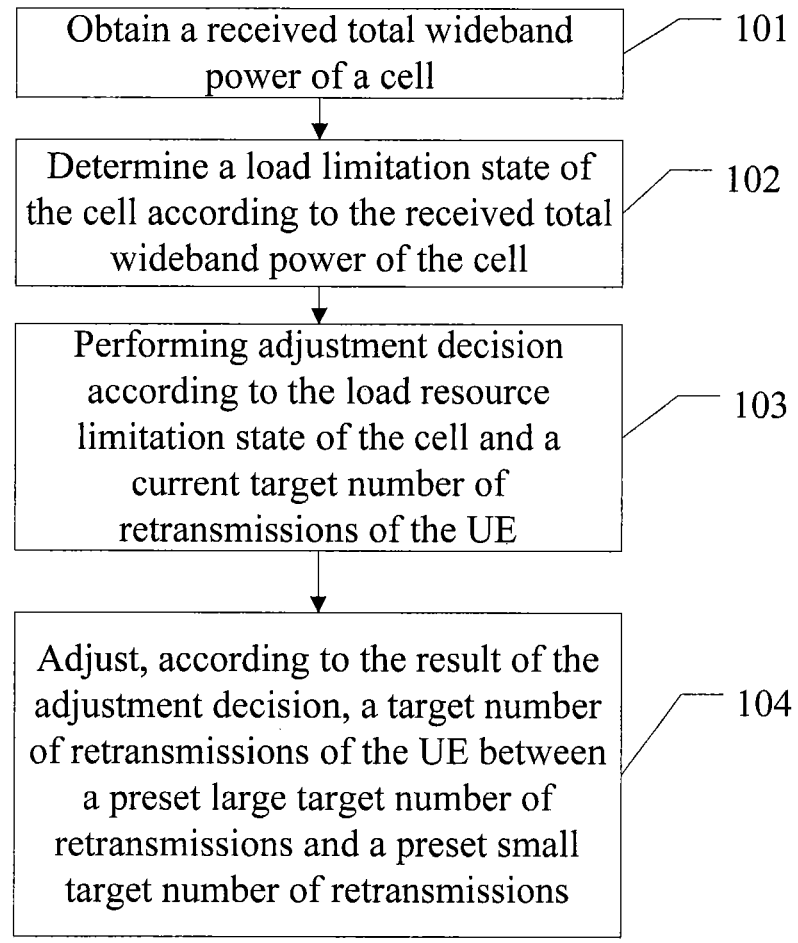
FIG. 1 is a schematic flowchart of a High Speed Uplink Packet Access adaptive retransmission method according to an embodiment of the present invention.

In the high speed uplink packet access adaptive retransmission method provided in this embodiment of the present invention, the target number of retransmissions is adjusted according to the load limitation state. FIG. 1 is a schematic flowchart of a high speed uplink packet access adaptive retransmission method according to an embodiment of the present invention. The method includes:

101. Obtain received total wideband power of a cell.

Obtain the received total wideband power (RTWP, Received Total Wideband Power) that is reported by the cell and is after filtering.

102. Determine the load limitation state of the cell according to the received total wideband power of the cell.

The method for determining the load limitation state of the cell may be: presetting an RTWP threshold, and comparing the obtained RTWP of the cell with the RTWP threshold; if the obtained RTWP of the cell is higher than the preset RTWP threshold, it is determined that the cell that covers the UE is under load limitation; and if the obtained RTWP of the cell is lower than the preset RTWP threshold, it is determined that the load of the cell that covers the UE is not limited.

Further, to prevent a ping-pong phenomenon and prevent changing the load limitation state of the cell between a limited state and an unlimited state too frequently, two RTWP thresholds may be used as a judgment condition. That is, an RTWP upper threshold and an RTWP lower threshold are preset, where the RTWP upper threshold is higher than the RTWP lower threshold. If the RTWP of the cell is higher than the preset upper threshold, it is determined that the load of the cell that covers the UE is limited; if the RTWP of the cell is lower than the preset lower threshold, it is determined that the load of the cell that covers the UE is not limited; if the RTWP of the cell falls between the RTWP upper threshold and the RTWP lower threshold, the load limitation state of the cell keeps unchanged, that is, the cell keeps the limited state if the load limitation state of the cell is the limited state, or the cell keeps the unlimited state if the load limitation state of the cell is the unlimited state.

103. Perform adjustment decision according to the load resource limitation state of the cell and the current target number of retransmissions of UE.

This step may be triggered by an event, or triggered periodically. The periodical triggering is that when preset time arrives, the adjustment decision is performed according to the resource limitation state.

When the transmission rate is the same, because the "large target number of retransmissions" and the "small target number of retransmissions" make different contributions to the RTWP in a case that the transmission rate is the same, if multiple UEs that use the large target number of retransmissions are adjusted to use the small target number of retransmissions in a short time, the RTWP of the system may become too high, and the load of the system may become too heavy. Therefore, in practical application, preferably, the adjustment of the "target number of retransmissions" is not performed for multiple UEs in a cell simultaneously; otherwise, the RTWP may be fluctuant and instable, and a ping-pong phenomenon is likely to occur. Based on such consideration, the periodical triggering manner is preferably adopted. For example, the use of a long triggering period may minimize the impact that the adjustment of the number of retransmissions causes on the RTWP and reduce times of the ping-pong switching and consumption of system resources.

When the periodical triggering mechanism is adopted, multiple UEs may meet the adjustment condition of the large target number of retransmissions and the small target number of retransmissions, but multiple UEs in one cell are preferably not adjusted simultaneously. In this case, a sorting rule of the adjustment decision may be taken into consideration. The following one or more factors are considered for the sorting rule of adjustment decision in this embodiment:

First factor: The UE at the edge of the cell may be first adjusted to the "large target number of retransmissions". Because such UEs are is more prone to rate decrease or even call drop, letting them use the "large target number of retransmissions" may effectively enhance the amount of data transmitted by the UE, accomplish higher power efficiency, and objectively, increase the cell capacity.

Second factor: With the "small target number of retransmissions", the effective rate is higher, and therefore, the UE of high priority should first use the "small target number of retransmissions"; conversely, the UE of low priority should first use the "large target number of retransmissions".

Third factor: Sorting may be performed by using the sorting rule of a scheduling algorithm. When the "small target number of retransmissions" is adjusted to the "large target number of retransmissions", to keep the effective rate of the UE at the existing level at least, the transport blocks of the UE need to increase rapidly. Therefore, the UEs that need to be adjusted to the "large target number of retransmissions" should be sorted in ascending speed order of scheduling algorithms; conversely, when the "large target number of retransmissions" is adjusted to the "small target number of retransmissions", the UEs that need to be adjusted to the "small target number of retransmissions" should be sorted in descending speed order of scheduling algorithms.

Such factors may be considered separately, or considered together. If they are considered together, they may be considered in order of preference. For example, the first factor is considered first, and then the second factor, and then the third factor, which is not limited in the embodiments of the present invention.

104. Adjust, according to a result of the adjustment decision, the target number of retransmissions of the UE between a preset large target number of retransmissions and a preset small target number of retransmissions.

If the load of the cell that covers the UE is limited and the UE currently uses the small target number of retransmissions, the preset large target number of retransmissions is used as the target number of retransmissions of the UE according to the result of the adjustment decision. Because the load of the cell is limited, the rate of the UE is also limited and cannot be enhanced. In this case, by using the large target number of retransmissions for retransmission, the diversity gain is obtained, the power efficiency is improved, the UE transmission rate and the cell transmission rate are enhanced, and the cell capacity is enhanced.

If the load of the cell that covers the UE is not limited and the UE currently uses the large target number of retransmissions, the preset small target number of retransmissions is used as the target number of retransmissions of the UE according to the result of the adjustment decision. In this case, because the load of the cell that covers the UE is not limited, that is, because the load is light, the use of the small target number of retransmissions enables the effective rate of the UE to approach or reach the utmost rate with the rapid increase of the physical-layer rate, and enhances the UE experience greatly.

The high speed uplink packet access adaptive retransmission method provided in this embodiment can adjust the target number of retransmissions according to the load condition of the cell, and improve utilization rate of resources.

Figure 2:
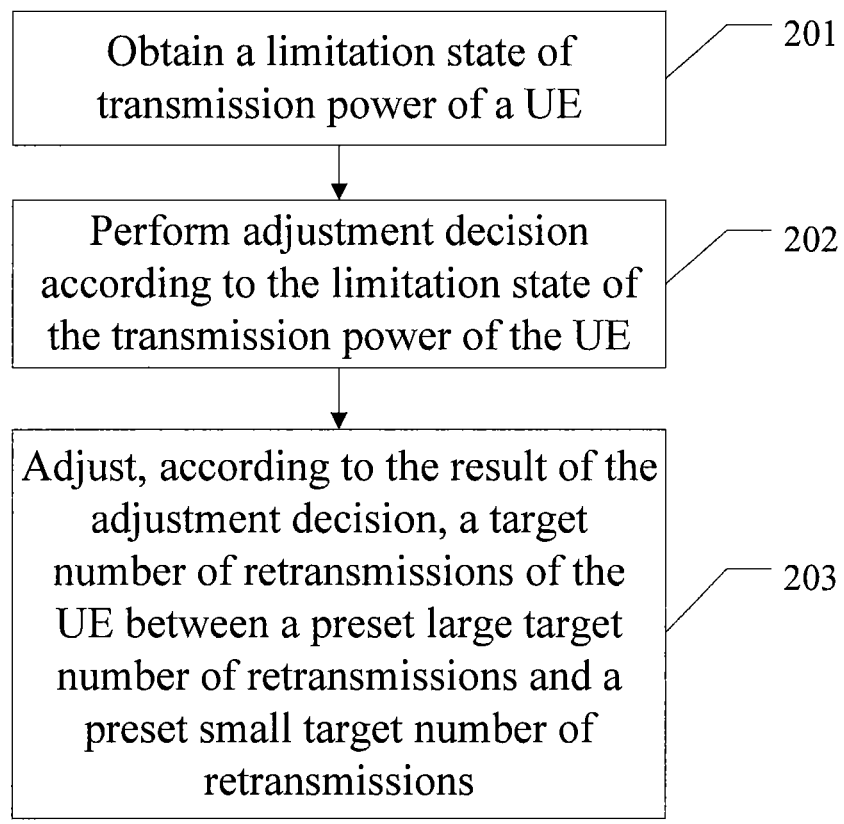
FIG. 2 is a schematic flowchart of a High Speed Uplink Packet Access adaptive retransmission method according to another embodiment of the present invention.

In a high speed uplink packet access adaptive retransmission method provided in another embodiment of the present invention, the adjustment is performed according to a limitation state of transmission power of the UE. FIG. 2 is a schematic flowchart of the high speed uplink packet access adaptive retransmission method according to another embodiment of the present invention. The method includes:

201. Obtain the limitation state of the transmission power of the UE.

In this embodiment, two methods may be used to judge whether the transmission power of the UE is limited:

First method: Judge whether the transmission power of the UE is limited according to the 6A event and the 6B event which are reported by the UE. When the measured transmission power of the UE is continuously higher than a specific threshold for a period, the 6A event is reported, which indicates that the transmission power of the UE is limited; when the transmission power is continuously lower than another threshold, the 6B event is reported, which indicates that the transmission power of the UE is not limited.

Second method: Judge, according to the measured value of the UE transmission power headroom (UPH, UE transmission Power Headroom) reported by the UE, whether the transmission power of the UE is limited. The UPH reported by the UE indicates the current value of the remaining transmission power of the UE. Compare the current value of the remaining transmission power with the maximum transmission power to obtain the value of the transmission power currently used by the UE. Compare the transmission power of the UE with the preset power threshold to judge whether the transmission power of the UE is limited. If the transmission power of the UE is lower than the preset power threshold, it indicates that the transmission power of the UE is not limited; if the transmission power of the UE is higher than the preset power threshold, it indicates that the transmission power of the UE is limited.

202. Perform adjustment decision according to the limitation state of the transmission power of the UE.

Perform adjustment decision according to the limitation state of the transmission power of the UE, and decide whether to adjust the target number of retransmissions of the UE between a preset large target number of retransmissions and a preset small target number of retransmissions, where the preset large target number of retransmissions is greater than the small target number of retransmissions.

In this embodiment, the condition of using the large target number of retransmissions may be that the transmission power of the UE is limited, and the condition of using the preset small target number of retransmissions may be that the transmission power of the UE is not limited. That is, when the transmission power of the UE is limited and the UE currently uses the small target number of retransmissions, the result of the adjustment decision is to adjust the target number of retransmissions of the UE from the small target number of retransmissions to the large target number of retransmissions; when the transmission power of the UE is not limited and the UE currently uses the large target number of retransmissions, the result of the adjustment decision is to adjust the target number of retransmissions of the UE from the large target number of retransmissions to the small target number of retransmissions.

This step may be triggered by an event, or triggered periodically. For the implementation manner of the periodical triggering, reference may be made to the description in step 103 above.

203. Adjust, according to the result of the adjustment decision, the target number of retransmissions of the UE between the preset large target number of retransmissions and the preset small target number of retransmissions.

If the transmission power of the UE is limited and the UE currently uses the small target number of retransmissions, the preset large target number of retransmissions is used as the target number of retransmissions of the UE according to the result of the adjustment decision. In this case, through more HARQ retransmissions, the diversity gain is obtained, the power efficiency is improved, the required transmission power is reduced, and the transmission rate of the UE is enhanced.

Generally, the UE at the edge of the cell is prone to limitation of the transmission power. if such UE uses the preset large target number of retransmissions as the target number of retransmissions for retransmission, the transmission efficiency of the UE may be improved and coverage of the cell may be widened.

If the transmission power of the UE is not limited and the UE currently uses the large target number of retransmissions, the preset small target number of retransmissions is used as the target number of retransmissions of the UE according to the result of the adjustment decision. In this case, because the transmission power of the UE is not limited any longer, the use of the small target number of retransmissions enables the effective rate of the UE to approach or reach the utmost rate, and enhances the UE experience greatly.

The high speed uplink packet access adaptive retransmission method provided in this embodiment may adjust, according to the limitation state of the transmission power of the UE, the target number of retransmissions, which may improve utilization rate of resources.

Figure 3:
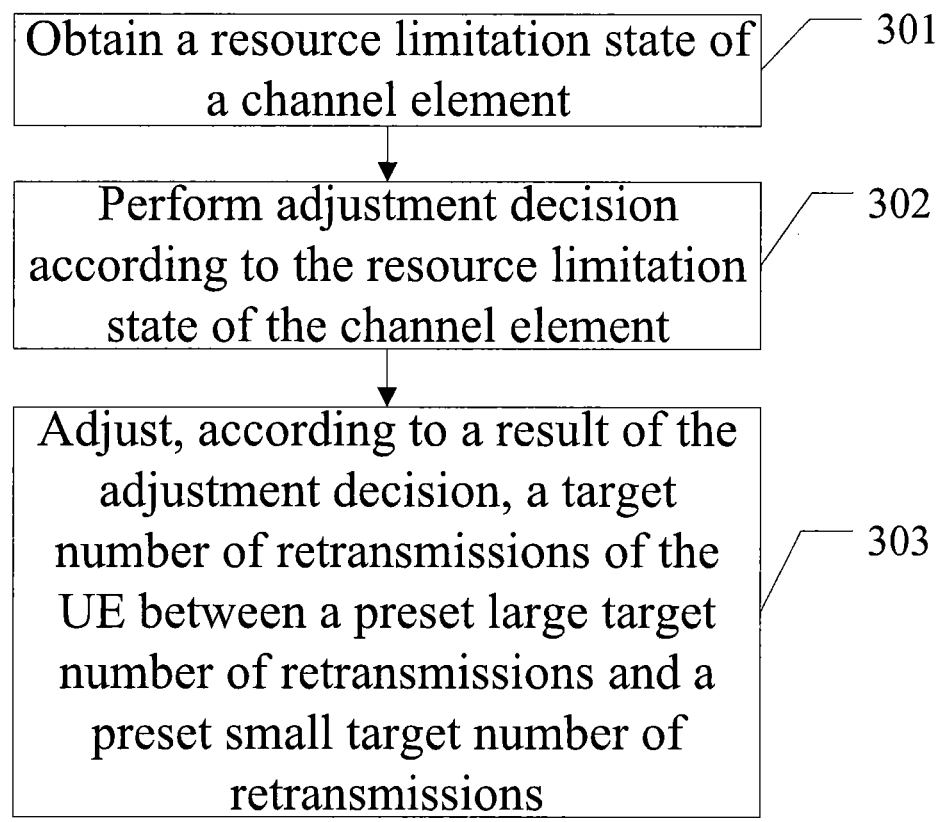
FIG. 3 is a schematic flowchart of a High Speed Uplink Packet Access adaptive retransmission method according to still another embodiment of the present invention.

In a high speed uplink packet access adaptive retransmission method provided in still another embodiment of the present invention, the adjustment is performed according to the resource limitation state of the channel element. FIG. 3 is a schematic flowchart of the high speed uplink packet access adaptive retransmission method according to another embodiment of the present invention. The method includes:

301. Obtain the resource limitation state of the channel element.

The method for obtaining the resource limitation state of the channel element is similar to the method for obtaining the load limitation state of the cell, and a threshold may be preset for judging whether the channel element resource is limited.

When a single threshold is adopted, a threshold of the number of channel elements, CEs, is preset. The total number of used CEs is compared with the threshold of the number of CEs. If the total number of used CEs is higher than the preset threshold of the number of CEs, it is determined that the channel element resource is limited; if the total number of used CEs is lower than the preset threshold of the number of CEs, it is determined that the channel element resource is not limited.

When two thresholds are adopted, an upper threshold of the number of CEs is preset, and a lower threshold of the number of CEs is preset, where the upper threshold of the number of CEs is greater than the lower threshold of the number of CEs. If the total number of CEs is higher than the preset upper threshold, it is determined that the channel element resource is limited; if the total number of CEs is lower than the preset lower threshold, it is determined that the channel element resource is not limited. If the total number of CEs falls between the upper threshold of the number of CEs and the lower threshold of the number of CEs, the limitation state of the channel element resource keeps unchanged, namely, the channel element resource goes on being limited if it is currently limited, or goes on being unlimited if it is currently unlimited.

302. Perform adjustment decision according to the limitation state of the channel element resource.

Perform adjustment decision according to the limitation state of the channel element resource, and decide whether to adjust the target number of retransmissions of the UE between a preset large target number of retransmissions and a preset small target number of retransmissions, where the preset large target number of retransmissions is greater than the small target number of retransmissions.

In this embodiment, when the channel element resource is limited, the result of the adjustment decision is to select the UE that currently uses the large target number of retransmissions, and the target number of retransmissions of the UE is adjusted from the large target number of retransmissions to the small target number of retransmissions. That is, when the channel element resource is limited, the target number of retransmissions the selected UE is adjusted from the "large target number of retransmissions" to the "small target number of retransmissions" until the channel element resource is not limited.

This step may be triggered by an event, or triggered periodically. For the implementation manner of the periodical triggering, reference may be made to the description in step 103 above.

Further, in any embodiment according to the present invention, when the result of the adjustment decision is to adjust the target number of retransmissions of the UE from the small target number of retransmissions to the large target number of retransmissions, it may be judged whether the channel element resource is limited. If the channel element resource is not limited, according to the result of the adjustment decision, the target number of retransmissions of the UE is adjusted between the preset large target number of retransmissions and the small target number of retransmissions.

303. Adjust, according to the result of the adjustment decision, the target number of retransmissions of the UE between the preset large target number of retransmissions and the preset small target number of retransmissions.

When the channel element resource is limited, the UE that uses the "large target number of retransmissions" is selected. According to the result of the adjustment decision, the preset small target number of retransmissions is used as the target number of retransmissions of the selected UE. The selected UE uses the preset small target number of retransmissions as the target number of retransmissions for retransmission.

Further, when both the limitation state of the cell load and the limitation state of the channel element resource are considered, the limitation state of the cell load may be considered first. If the cell load is very high, even if the CE resource is limited, it is unnecessary for the selected UE to adjust the used target number of retransmissions from the "large target number of retransmissions" to the "small target number of retransmissions". For a heavy-loaded UE, the power efficiency is more important than the CE efficiency. Although the CE efficiency in a case that the "large target number of retransmissions" is used is lower than that in a case of the "small target number of retransmissions", the power efficiency in the case of the "large target number of retransmissions" is obviously higher. Therefore, in this case, the "target number of retransmissions" of the UE with the "large target number of retransmissions" needs to be maintained, so as to keep high transmission rate of the cell. The power efficiency here may be understood as the UE transmission rate bearable by a unit power; likewise, the CE efficiency refers to the UE transmission rate provided by a unit channel element resource.

In the high speed uplink packet access adaptive retransmission method provided in the embodiment, the target number of retransmissions may be adjusted according to the limitation state of the channel element resource, and the utilization rate of resources may be improved.

Figure 4:
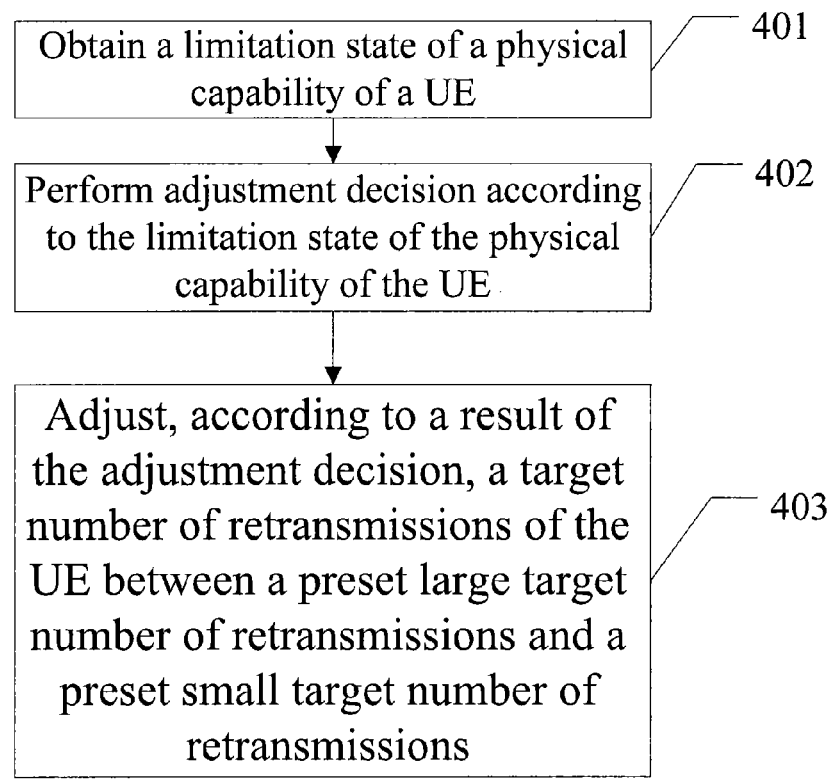
FIG. 4 is a schematic flowchart of a High Speed Uplink Packet Access adaptive retransmission method according to yet another embodiment of the present invention.

In a high speed uplink packet access adaptive retransmission method provided in yet another embodiment of the present invention, the adjustment is performed according to the limitation state of physical capability of the UE. FIG. 4 is a schematic flowchart of the high speed uplink packet access adaptive retransmission method according to another embodiment of the present invention. The method includes:

401. Obtain a limitation state of the physical capability of the UE.

When the UE uses the preset large target number of retransmissions as the target number of retransmissions for retransmission and the number of used transport blocks reaches a maximum value specified by a protocol, that is, the transmission rate of the physical layer is almost full, and the effective rate of the UE cannot be enhanced any more. In this case, it is determined that the physical capability of the UE is limited. Otherwise, it is determined that the physical capability of the UE is not limited.

402. Perform adjustment decision according to the limitation state of the physical capability of the UE.

When the physical capability of the UE is limited, if the UE continuously uses the preset large target number of retransmissions as the target number of retransmissions for retransmission, the transmission rate of the UE is continuously limited, which finally results in deterioration of fairness difference between UEs and affects the UE experience.

Therefore, in this embodiment, when the physical capability of the UE is limited and the UE currently uses the large target number of retransmissions, the result of the adjustment decision is to adjust the "large target number of retransmissions" to the "small target number of retransmissions" to reduce the HARQ retransmissions, improve the transmission efficiency, and enhance the transmission rate of the UE; if the physical capability of the UE is not limited, the result of the adjustment decision is to keep the current target number of retransmissions of the UE unchanged.

This step may be triggered by an event, or triggered periodically. For the implementation manner of the periodical triggering, reference may be made to the description in step 103 above.

403. Adjust, according to the result of the adjustment decision, the target number of retransmissions of the UE between the preset large target number of retransmissions and the preset small target number of retransmissions.

If the physical capability of the UE is limited and the UE currently uses the large target number of retransmissions, the preset small target number of retransmissions is used as the target number of retransmissions of the UE according to the result of the adjustment decision, so as to reduce HARQ retransmissions, improve the transmission efficiency, and enhance the transmission rate of the UE.

In the high speed uplink packet access adaptive retransmission method provided in the embodiment, the target number of retransmissions may be adjusted according to the limitation state of the physical capability of the UE, and the utilization rate of resources may be improved.

The foregoing embodiments of the high speed uplink packet access adaptive retransmission method are described with regard to the limitation state of the cell load, the limitation state of the transmission power of the UE, the limitation state of the channel element resource, and the limitation state of the physical capability of the UE, respectively. Further, the system may adjust the target number of retransmissions with reference to more than one of the limitation state of the cell load, the limitation state of the transmission power of the UE, the limitation state of the physical capability of the UE, and the limitation state of the channel element resource. The priority levels of the four limitation states may be sorted according to the actual situations. For example, the limitation state of the cell load has the highest priority level, and the preset large target number of retransmissions keeps being the target number of retransmissions for retransmission when the cell load is limited.

Further, because a maximum effective rate supported by the "large target number of retransmissions" is obviously lower than a maximum effective rate which is supported by the "small target number of retransmissions", in order to ensure that the rate of the UE is not decreased after the "target number of retransmissions" is adjusted, before the used target number of retransmissions of the UE is adjusted from the "small target number of retransmissions" to the "large target number of retransmissions", the effective rate of the UE should be lower than a specific threshold, for example, lower than the utmost rate of retransmission performed by using the large target number of retransmissions. If the effective rate is higher than the utmost rate of retransmission performed by using the large target number of retransmissions, no adjustment is performed, and the "small target number of retransmissions" continues being used for retransmission, so as to ensure the effective rate of the UE first.

A signal-to-interference ratio (SIR, Signal-to-Interference Ratio) operating point in the case of the "large target number of retransmissions" is generally different from that in the case of the "small target number of retransmissions". Therefore, when a UE is adjusted between the "large target number of retransmissions" and the "small target number of retransmissions", some special treatments need to be added to quicken a convergence speed of a power control algorithm, so that the average number of retransmissions may converge at a new "target number of retransmissions" quickly. Two methods are applicable here: One is to modify a target value of the SIR so that the SIR can start operating from which is closer to a new SIR operating point, after the large target number of retransmissions and the small target number of retransmissions are adjusted; and the other is to adjust a power offset (PO, Power Offset) of the hybrid automatic repeat request (HARQ, Hybrid Automatic Repeat reQuest), and this method quickly increases or decreases the transmission power of the enhanced dedicated physical data channel (E-DPDCH, Enhanced Dedicated Physical Data Channel) after the number of retransmissions is adjusted, so that the average number of retransmissions of the service can change quickly and converge at a new "target number of retransmissions" more quickly.

Persons of ordinary skill in the art can understand that all or part of the steps in the method embodiments above may be implemented by a program instructing relevant hardware. The program may be stored in a computer readable storage medium. When the program runs, the following steps are included:

A high speed uplink packet access adaptive retransmission method, including:

obtaining a resource limitation state;

performing adjustment decision according to the resource limitation state and a current target number of retransmissions of a UE; and adjusting, according to a result of the adjustment decision, a target number of retransmissions of the UE between a preset large target number of retransmissions and a preset small target number of retransmissions, where the large target number of retransmissions is greater than the small target number of retransmissions.

The storage medium may be a read-only memory, magnetic disk, or CD-ROM.

Figure 5:
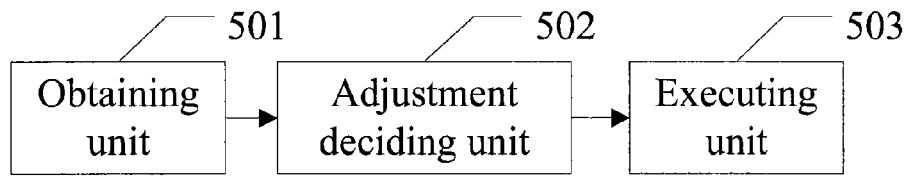
FIG. 5 is a schematic structural diagram of a High Speed Uplink Packet Access adaptive retransmission apparatus according to an embodiment of the present invention.

The high speed uplink packet access adaptive retransmission apparatus provided in the embodiments of the present invention may be a network device such as a base station (NodeB) and a radio network controller (RNC, Radio Network Controller), etc. The apparatus, the structure of which is as shown in FIG. 5, includes:

an obtaining unit 501, configured to obtain a resource limitation state;

an adjustment deciding unit 502, configured to perform adjustment decision according to the resource limitation state obtained by the obtaining unit 501 and a current target number of retransmissions of a UE; and an executing unit 503, configured to adjust, according to a result of the adjustment decision of the adjustment deciding unit 502, a target number of retransmissions of the UE between a preset large target number of retransmissions and a preset small target number of retransmissions, where the large target number of retransmissions is greater than the small target number of retransmissions.

When the resource limitation state is a load limitation state of a cell: the obtaining unit 501 includes:

a first obtaining unit, configured to: compare received total wideband power of the cell with a preset threshold of the received total wideband power; if the received total wideband power of the cell is higher than a preset threshold of the received total wideband power, determine that the load of the cell covering the UE is limited; and if the received total wideband power of the cell is lower than the preset threshold of the received total wideband power, determine that the load of the cell covering the UE is not limited;

or, a second obtaining unit, configured to: compare received total wideband power of the cell with a preset threshold of the received total wideband power; if the received total wideband power of the cell is higher than a preset upper threshold of the received total wideband power, determine that the load of the cell covering the UE is limited; and if the received total wideband power of the cell is lower than a preset lower threshold of the received total wideband power, determine that the load of the cell covering the UE is not limited.

The adjustment deciding unit 502 includes:

a first adjustment deciding unit, configured to give a result of adjustment decision of adjusting the target number of retransmissions of the UE from the preset small target number of retransmissions to the large target number of retransmissions, when the load of the cell that covers the UE is limited and the UE currently uses the small target number of retransmissions; and/or give a result of adjustment decision of adjusting the target number of retransmissions of the UE from the preset large target number of retransmissions to the small target number of retransmissions, when the load of the cell that covers the UE is not limited and the UE currently uses the large target number of retransmissions.

When the resource limitation state is a limitation state of the transmission power of the UE: the obtaining unit 501 includes:

a third obtaining unit, configured to judge, according to a 6A event and a 6B event which are reported by the UE, whether the transmission power of the UE is limited;

or, a fourth obtaining unit, configured to obtain, according to the UE transmission power headroom reported by the UE, the value of the transmission power currently used by the UE, and compare the value of the transmission power currently used by the UE with the preset power threshold to check whether the transmission power of the UE is limited.

The adjustment deciding unit 502 includes:

a second adjustment deciding unit, configured to give a result of adjustment decision of adjusting the target number of retransmissions of the UE from the small target number of retransmissions to the large target number of retransmissions, when the transmission power of the UE is limited and the UE currently uses the small target number of retransmissions; and/or give a result of adjustment decision of adjusting the target number of retransmissions of the UE from the large target number of retransmissions to the small target number of retransmissions, when the transmission power of the UE is not limited and the UE currently uses the large target number of retransmissions.

When the resource limitation state is a resource limitation state of a channel element: the obtaining unit 501 includes:

a fifth obtaining unit, configured to compare the total number of used CEs with a preset threshold of the number of CEs; if the total number of CEs is higher than the preset threshold of the number of CEs, determine that the channel element resource is limited; and if the total number of CEs is lower than the preset threshold of the number of CEs, determine that the channel element resource is not limited;

or, a sixth obtaining unit, configured to compare the total number of CEs with preset thresholds of the number of CEs; if the total number of CEs is higher than a preset upper threshold of the number of CEs, determine that the channel element resource is limited; and if the total number of CEs is lower than a preset lower threshold of the number of CEs, determine that the channel element resource is not limited.

The adjustment deciding unit 502 includes:

a third adjustment deciding unit, configured to give a result of adjustment decision of selecting the UE that currently uses the large target number of retransmissions and adjusting the target number of retransmissions of the UE from the large target number of retransmissions to the small target number of retransmissions, when the channel element resource is limited.

When the resource limitation state is a limitation state of the physical capability of the UE: the obtaining unit 501 includes:

a seventh obtaining unit, configured to: when the UE uses the preset large target number of retransmissions as the target number of retransmissions for retransmission, the rate of the physical layer is almost full, and the effective rate of the UE cannot be enhanced any more, determine that the physical capability of the UE is limited; otherwise, determine that the physical capability of the UE is not limited.

The adjustment deciding unit 502 includes:

a fourth adjustment deciding unit, configured to give a result of adjustment decision of adjusting the target number of retransmissions of the UE from the large target number of retransmissions to the small target number of retransmissions, when the physical capability of the UE is limited and the UE currently uses the large target number of retransmissions; and/or give a result of adjustment decision of keeping the current target number of retransmissions of the UE unchanged, when the physical capability of the UE is not limited.

Further, the High Speed Uplink Packet Access adaptive retransmission apparatus in this embodiment may further include:

a judging unit, configured to: judge whether the channel element resource is limited, when the result of the adjustment decision of the adjustment judging unit is to adjust the target number of retransmissions of the UE from the small target number of retransmissions to the large target number of retransmissions; and, if the channel element resource is not limited, control the executing unit to adjust, according to the result of the adjustment decision, the target number of retransmissions of the UE between the preset large target number of retransmissions and the small target number of retransmissions.

Further, because a maximum effective rate supported by the "large target number of retransmissions" is obviously lower than a maximum effective rate supported by the "small target number of retransmissions", in order to ensure that the rate of the UE is not decreased after the "target number of retransmissions" is adjusted, before the used target number of retransmissions of the UE is adjusted from the "small target number of retransmissions" to the "large target number of retransmissions", the effective rate of the UE should be lower than a specific threshold, for example, lower than the utmost rate of retransmission performed by using the large target number of retransmissions. If the effective rate is higher than the utmost rate of retransmission performed by using the large target number of retransmissions, no adjustment is performed, and the "small target number of retransmissions" continues being used for retransmission, so as to ensure the effective rate of the UE first. Therefore, the High Speed Uplink Packet Access adaptive retransmission apparatus may further include:

a comparing unit, configured to: if the result of the adjustment decision of the adjustment judging unit 502 is to adjust the target number of retransmissions of the UE from the preset small target number of retransmissions to the large target number of retransmissions, compare the effective rate of the UE with the preset threshold; and, if the effective rate of the UE is higher than the preset threshold, notify the executing unit 503 of keeping the target number of retransmissions of the UE unchanged.

Further, the High Speed Uplink Packet Access adaptive retransmission apparatus may include:

a first convergence processing unit, configured to modify the target value of the signal-to-interference ratio, when the executing unit 503 adjusts, according to the result of the adjustment decision, the target number of retransmissions of the UE between the preset large target number of retransmissions and the preset small target number of retransmissions;

and/or, a second convergence processing unit, configured to adjust a Hybrid Automatic Repeat Request power offset, when the executing unit 503 adjusts, according to the result of the adjustment decision, the target number of retransmissions of the UE between the preset large target number of retransmissions and the preset small target number of retransmissions.

For the detailed operation method of the High Speed Uplink Packet Access adaptive retransmission apparatus provided in this embodiment, reference may be made to the preceding description about the High Speed Uplink Packet Access adaptive retransmission method provided in the embodiments of the present invention.

A High Speed Uplink Packet Access adaptive retransmission method and apparatus provided in the present invention has been described in detail above. In this document, specific examples are used for describing the principles and implementation manners of the present invention, and the illustration of the preceding embodiments are merely used to facilitate the understanding of the method and the core idea of the present invention. A person skilled in the art can make modifications and variations in terms of specific implementation manners and application scope, according to the idea of the present invention. Therefore, the content of this specification shall not be construed as a limitation of the present invention.

What is claimed is:

1. A high speed uplink packet access adaptive retransmission method, characterized by comprising:

obtaining, by a network device, a resource limitation state of a cell on basis of a load limitation state of the cell determined according to upper and lower received total wideband power (RTWP) thresholds for the cell;

performing, by the network device, adjustment decision according to the resource limitation state of the cell obtained on basis of the load limitation state of the cell determined according to the upper and lower RTWP thresholds and a current target number of retransmissions of a UE; and adjusting, by the network device, according to a result of the adjustment decision performed according to the resource limitation state of the cell obtained on basis of the load limitation state of the cell determined according to the upper and lower RTWP thresholds, the target number of retransmissions of the UE between a preset large target number of retransmissions and a preset small target number of retransmissions, wherein the large target number of retransmissions is greater than the small target number of retransmissions, wherein the obtaining the load limitation state of the cell comprises:

comparing, by the network device, an RTWP of the cell with the upper RTWP threshold; if the RTWP of the cell is higher than the upper RTWP threshold, determining that the load of the cell covering the UE is limited; and if the RTWP of the cell is lower than the upper RTWP threshold, determining that the load of the cell covering the UE is not limited; or comparing, by the network device, the RTWP of the cell with the upper RTWP threshold; if the RTWP of the cell is higher than the upper RTWP threshold, determining that the load of the cell covering the UE is limited; and if the RTWP of the cell is lower than the lower RTWP threshold, determining that the load of the cell covering the UE is not limited, wherein the upper RTWP threshold is higher than the lower RTWP threshold;

wherein the performing of the adjustment decision comprises:

adjusting the target number of retransmissions of the UE from the preset small target number of retransmissions to the lame target number of retransmissions, when the load of the cell that covers the UE is limited and the UE currently uses the small target number of retransmissions; and/or adjusting the target number of retransmissions of the UE from the preset lame target number of retransmissions to the small target number of retransmissions, when the load of the cell that covers the UE is not limited and the UE currently uses the lame target number of retransmissions.

2. The method according to claim 1, wherein the performing of the adjustment decision for a UE from among a plurality of UEs comprises at least one of the following three manners of adjustment decision:

first adjusting the target number of retransmissions of the UE at an edge of the cell to the preset large target number of retransmissions; or according to the result of the adjustment decision, first adjusting, according to preset priority of the UE, the large target number of retransmissions of a high-priority UE to the preset small target number of retransmissions, when the result of the adjustment decision is to adjust the target number of retransmissions of the UE from the preset large target number of retransmissions to the small target number of retransmission, and first adjusting, according to preset priority of the UE, the small target number of retransmissions of a low-priority UE to the preset large target number of retransmissions, when the result of the adjustment decision is to adjust the target number of retransmissions of the UE from the preset small target number of retransmissions to the large target number of retransmissions; or according to the result of the adjustment decision, when adjusting the target number of retransmissions of the UE from the preset small target number of retransmissions to the large target number of retransmissions, sorting UEs that need to be adjusted to the large target number of retransmissions, in ascending speed order of a scheduling algorithm, and when adjusting the target number of retransmissions of the UE from the preset large target number of retransmissions to the small target number of retransmissions, sorting UEs that need to be adjusted to the small target number of retransmissions, in descending speed order of the scheduling algorithm.

3. The method according to claim 1, wherein the method further comprises:

after the adjustment decision is performed, if the result of the adjustment decision is to adjust the target number of retransmissions of the UE from the preset small target number of retransmissions to the large target number of retransmissions, comparing, by the network device, an effective rate of the UE with a preset threshold; and, if the effective rate of the UE is higher than the preset threshold, keeping the target number of retransmissions of the UE unchanged.

4. The method according to claim 1, wherein the method further comprises:

modifying, by the network device, a target value of a signal-to-interference ratio, when adjusting, according to the result of the adjustment decision, the target number of retransmissions of the UE between the preset large target number of retransmissions and the preset small target number of retransmissions; or adjusting, by the network device, a hybrid automatic repeat request power offset, when adjusting, according to the result of the adjustment decision, the target number of retransmissions of the UE between the preset large target number of retransmissions and the preset small target number of retransmissions.

5. The method according to claim 1, wherein the resource limitation state is a limitation state of a transmission power of the UE; and the obtaining the resource limitation state comprises:
judging, by the network device, according to power measurements reported by the UE, whether the transmission power of the UE is limited; or
obtaining, by the network device, according to UE transmission power headroom reported by the UE, value of the transmission power currently used by the UE, and comparing the value of the transmission power currently used by the UE with a preset power threshold to check whether the transmission power of the UE is limited;

wherein the performing adjustment decision according to the resource limitation state and the current target number of retransmissions of the UE comprises:
adjusting the target number of retransmissions of the UE from the small target number of retransmissions to the large target number of retransmissions, when the transmission power of the UE is limited and the UE currently uses the small target number of retransmissions; or adjusting the target number of retransmissions of the UE from the large target number of retransmissions to the small target number of retransmissions, when the transmission power of the UE is not limited and the UE currently uses the large target number of retransmissions.

6. The method according to claim 1, wherein the resource limitation state is a resource limitation state of channel element resource; and the obtaining the resource limitation state comprises:
comparing, by the network device, a total number of used channel elements with a preset threshold of the number of channel elements; if the total number of used channel elements is higher than the preset threshold of the number of channel elements, determining that the channel element resource is limited; and if the total number of used channel elements is lower than the preset threshold of the number of channel elements, determining that the channel element resource is not limited; or
comparing, by the network device, the total number of channel elements with preset thresholds of the number of channel elements; if the total number of used channel elements is higher than a preset upper threshold of the number of channel elements, determining that the channel element resource is limited; and if the total number of used channel elements is lower than a preset lower threshold of the number of channel elements, determining that the channel element resource is not limited;

wherein the performing adjustment decision according to the resource limitation state and the current target number of retransmissions of the UE comprises:
when the channel element resource is limited, the result of the adjustment decision is to select a UE which current target number of retransmissions is the large target number of retransmissions and adjust the target number of retransmissions of the UE from the large target number of retransmission to the small target number of retransmissions.

7. The method according to claim 1, further comprising:
when the result of the adjustment decision is to adjust the target number of retransmissions of the UE from the small target number of retransmissions to the large target number of retransmissions, judging whether channel element resource is limited; if the channel element resource is not limited, adjusting, according to the result of the adjustment decision, the target number of retransmissions of the UE between the preset large target number of retransmissions and the small target number of retransmissions.

8. The method according to claim 1, wherein the resource limitation state is that a limitation state of a physical capability of the UE; and the obtaining the resource limitation state comprises:
when the UE uses the preset large target number of retransmissions as the target number of retransmissions for retransmission and a transmission rate of a physical layer of the UE is determined as reaching a maximum value, determining that the physical capability of the UE is limited; otherwise, determining that the physical capability of the UE is not limited;

wherein the performing adjustment decision according to the resource limitation state and the current target number of retransmissions of the UE comprises:
adjusting the target number of retransmissions of the UE from the large target number of retransmissions to the small target number of retransmissions, when the physical capability of the UE is limited and the UE currently uses the large target number of retransmissions; or keeping a current target number of retransmissions of the UE unchanged, when the physical capability of the UE is not limited.

9. A high speed uplink packet access adaptive retransmission apparatus comprising:

computer hardware and non-transitory computer readable storage medium which store instructions when executed by the computer hardware implement units comprising:

an obtaining unit, configured to obtain a resource limitation state of a cell on basis of a load limitation state of the cell determined according to upper and lower received total wideband power (RTWP) thresholds for the cell;

an adjustment deciding unit, configured to perform adjustment decision according to the resource limitation state of the cell obtained on basis of the load limitation state of the cell determined according to the upper and lower RTWP thresholds and a current target number of retransmissions of a UE; and an executing unit, configured to adjust, according to a result of the adjustment decision performed according to the resource limitation state of the cell obtained on basis of the load limitation state of the cell determined according to the upper and lower RTWP thresholds, a target number of retransmissions of the UE between a preset large target number of retransmissions and a preset small target number of retransmissions, wherein the large target number of retransmissions is greater than the small target number of retransmissions, wherein the obtaining unit configuration to obtain the load limitation state of the cell comprises:

to compare an RTWP of the cell with the upper RTWP threshold; if the RTWP of the cell is higher than the upper RTWP threshold, determine that the load of the cell covering the UE is limited; and if the RTWP of the cell is lower than the upper RTWP threshold, determine that the load of the cell covering the UE is not limited; or to compare the RTWP of the cell with the upper RTWP threshold; and determine that the load of the cell covering the UE is limited if the RTWP of the cell is higher than the upper RTWP threshold, or determine that the load of the cell covering the UE is not limited if the RTWP of the cell is lower than the lower RTWP threshold;

wherein the adjustment deciding unit configuration comprises:

to adjust the target number of retransmissions of the UE from the preset small target number of retransmissions to the lame target number of retransmissions, when the load of the cell that covers the UE is limited and the UE currently uses the small target number of retransmissions; and/or to adjust the target number of retransmissions of the UE from the preset lame target number of retransmissions to the small target number of retransmissions, when the cell that covers the UE is not limited and the UE currently uses the lame target number of retransmissions.

10. The apparatus according to claim 9, further comprising:

a comparing unit, configured to:

if the result of the adjustment decision of the adjustment judging unit is to adjust the target number of retransmissions of the UE from the preset small target number of retransmissions to the large target number of retransmissions, compare an effective rate of the UE with a preset threshold; and if the effective rate of the UE is higher than the preset threshold, notify the executing unit of keeping the target number of retransmissions of the UE unchanged.

11. The apparatus according to claim 9, further comprising at least one of the following:

a first convergence processing unit, configured to modify a target value of a signal-to-interference ratio, when the executing unit adjusts, according to the result of the adjustment decision, the target number of retransmissions of the UE between the preset large target number of retransmissions and the preset small target number of retransmissions; or a second convergence processing unit, configured to adjust a Hybrid Automatic Repeat Request power offset, when the executing unit adjusts, according to the result of the adjustment decision, the target number of retransmissions of the UE between the preset large target number of retransmissions and the preset small target number of retransmissions.

12. The apparatus according to claim 9, wherein the resource limitation state is a limitation state of a transmission power of the UE, the obtaining unit configuration comprises:

to judge according to power measurements reported by the UE, whether the transmission power of the UE is limited; or to obtain, according to a UE transmission power headroom reported by the UE, a value of the transmission power currently used by the UE, and compare the value of the transmission power currently used by the UE with a preset power threshold to check whether the transmission power of the UE is limited;

the adjustment deciding unit configuration comprises at least one of the following:

to adjust the target number of retransmissions of the UE from the small target number of retransmissions to the large target number of retransmissions, when the transmission power of the UE is limited and the UE currently uses the small target number of retransmissions; or to adjust the target number of retransmissions of the UE from the large target number of retransmissions to the small target number of retransmissions, when the transmission power of the UE is not limited and the UE currently uses the large target number of retransmissions.

13. The apparatus according to claim 9, wherein the resource limitation state is a resource limitation state of channel element (CE) resource, the obtaining unit configuration comprises:

to compare a total number of used CEs with a preset threshold of the number of CEs; if the total number of used CEs is higher than the preset threshold of the number of CEs, determine that the channel element resource is limited; and if the total number of used CEs is lower than the preset threshold of the number of CEs, determine that the channel element resource is not limited; or to compare the total number of used CEs with preset thresholds of the number of CEs; if the total number of used CEs is higher than a preset upper threshold of the number of CEs, determine that the channel element resource is limited; and if the total number of used CEs is lower than a preset lower threshold of the number of CEs, determine that the channel element resource is not limited; and the adjustment deciding unit configuration comprises:
to select the UE that currently uses the large target number of retransmissions and adjusting the target number of retransmissions of the UE from the large target number of retransmissions to the small target number of retransmissions, when the channel element resource is limited.

14. The apparatus according to claim 9, wherein the resource limitation state is a limitation state of a physical capability of the UE, the obtaining unit configuration comprises:
when the UE uses the preset large target number of retransmissions as the target number of retransmissions for retransmission and a transmission rate of a physical layer of the UE is determined as reaching a maximum value, to determine that the physical capability of the UE is limited; otherwise, determine that the physical capability of the UE is not limited;

the adjustment deciding unit configuration comprises:
to adjust the target number of retransmissions of the UE from the large target number of retransmissions to the small target number of retransmissions, when the physical capability of the UE is limited and the UE currently uses the large target number of retransmissions; and/or to keep the current target number of retransmissions of the UE unchanged, when the physical capability of the UE is not limited.

15. The apparatus according to claim 9, further comprising:
a judging unit, configured to: judge whether channel element resource is limited, when the result of the adjustment decision of the adjustment judging unit is to adjust the target number of retransmissions of the UE from the small target number of retransmissions to the large target number of retransmissions; and, if the channel element resource is not limited, control the executing unit to adjust, according to the result of the adjustment decision, the target number of retransmissions of the UE between the preset large target number of retransmissions and the small target number of retransmissions.

16. The apparatus according to claim 9, wherein the high speed uplink packet access adaptive retransmission apparatus is a base station or a radio network controller.

17. A communication system, comprising:
a network device communicably coupled with a user equipment (UE), wherein the network device and UE comprise computer hardware and non-transitory computer readable storage medium which store instructions when executed by the computer hardware implement functions, the network device is implemented with functions of:
obtain a resource limitation state of a cell on basis of a load limitation state of the cell determined according to upper and lower received total wideband power (RTWP) thresholds for the cell;
perform adjustment decision according to the resource limitation state of the cell obtained on basis of the load limitation state of the cell determined according to the upper and lower RTWP thresholds and a current target number of retransmissions of a UE; and
adjust, according to a result of the adjustment decision performed according to the resource limitation state of the cell obtained on basis of the load limitation state of the cell determined according to the upper and lower RTWP thresholds, a target number of retransmissions of the UE between a preset large target number of retransmissions and a preset small target number of retransmissions, wherein the large target number of retransmissions is greater than the small target number of retransmissions, wherein the obtainment of the load limitation state of the cell comprises:
comparing, by the network device, an RTWP of the cell with the upper RTWP threshold; if the RTWP of the cell is higher than the upper RTWP threshold, determining that the load of the cell covering the UE is limited; and if the RTWP of the cell is lower than the upper RTWP threshold, determining that the load of the cell covering the UE is not limited; or comparing, by the network device, the RTWP of the cell with the upper RTWP threshold; if the RTWP of the cell is higher than the upper RTWP threshold, determining that the load of the cell covering the UE is limited; and if the RTWP of the cell is lower than the lower RTWP threshold, determining that the load of the cell covering the UE is not limited, wherein the upper RTWP threshold is higher than the lower RTWP threshold;

wherein the adjustment decision comprises:
adjusting the target number of retransmissions of the UE from the preset small target number of retransmissions to the lame target number of retransmissions, when the load of the cell that covers the UE is limited and the UE currently uses the small target number of retransmissions; and/or adjusting the target number of retransmissions of the UE from the preset lame target number of retransmissions to the small target number of retransmissions, when the load of the cell that covers the UE is not limited and the UE currently uses the lame target number of retransmissions.

18. The communication system according to claim 17, wherein the adjustment decision for a UE from among a plurality of UEs is performed in at least one of the following manners:
first adjusting the target number of retransmissions of the UE at an edge of the cell to the preset large target number of retransmissions;

first adjusting, according to preset priority of the UE, the large target number of retransmissions of a high-priority UE to the preset small target number of retransmissions, when the result of the adjustment decision is to adjust the target number of retransmissions of the UE from the preset large target number of retransmissions to the small target number of retransmissions; and first adjusting, according to preset priority of the UE, the small target number of retransmissions of a low-priority UE to the preset large target number of retransmissions, when the result of the adjustment decision is to adjust the target number of retransmissions of the UE from the preset small target number of retransmissions to the large target number of retransmissions; or when adjusting the target number of retransmissions of the UE from the preset small target number of retransmissions to the large target number of retransmissions, sorting UEs that need to be adjusted to the large target number of retransmissions, in ascending speed order of a scheduling algorithm; and when adjusting the target number of retransmissions of the UE from the preset large target number of retransmissions to the small target number of retransmissions, sorting UEs that need to be adjusted to the small target number of retransmissions, in descending speed order of the scheduling algorithm.

\* \* \* \* \*